(12) United States Patent
Ochiai et al.

(10) Patent No.: US 10,625,574 B2
(45) Date of Patent: Apr. 21, 2020

(54) VENTILATION APPARATUS

(71) Applicant: DENSO CORPORATION, Kariya, Aichi-pref. (JP)

(72) Inventors: Toshinori Ochiai, Kariya (JP); Shuzo Oda, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/305,943

(22) PCT Filed: Jun. 24, 2015

(86) PCT No.: PCT/JP2015/003174
§ 371 (c)(1),
(2) Date: Oct. 21, 2016

(87) PCT Pub. No.: WO2016/006187
PCT Pub. Date: Jan. 14, 2016

(65) Prior Publication Data
US 2017/0050495 A1    Feb. 23, 2017

(30) Foreign Application Priority Data
Jul. 10, 2014   (JP) ................................. 2014-141884

(51) Int. Cl.
*B60H 1/34*  (2006.01)
*B60H 1/24*  (2006.01)
(Continued)

(52) U.S. Cl.
CPC ........... *B60H 1/3421* (2013.01); *B60H 1/245* (2013.01); *F24F 13/06* (2013.01); *F24F 13/14* (2013.01);
(Continued)

(58) Field of Classification Search
CPC ... B60H 1/26; B60H 1/24; B60H 1/34; B60H 1/3421; B60H 1/245; F24F 13/06
(Continued)

(56) References Cited

U.S. PATENT DOCUMENTS 2,230,203 A * 1/1941 Ludwig ................... F24F 13/06
454/306
4,022,599 A * 5/1977 Wilson ............... B60H 1/00042
165/41
(Continued)

FOREIGN PATENT DOCUMENTS

DE      10202926 A1    7/2003
JP      H04004652 U    1/1992
(Continued)

*Primary Examiner* — Grant Moubry
*Assistant Examiner* — Phillip Decker
(74) *Attorney, Agent, or Firm* — Harness, Dickey & Pierce, P.L.C.

(57) ABSTRACT

A ventilation apparatus blows air into a vehicle compartment of a vehicle. The ventilation apparatus has a blower, a duct, a blowing outlet, guide vanes, and a turning mechanism. The blowing outlet is provided with the duct. The blowing outlet guides the air to flow along a lower surface of the duct. The guide vanes change a flow velocity component of the air in a lateral direction of the vehicle by guiding the air to flow along the guide vanes. The guide vanes are arranged in the duct on an upstream side of the blowing outlet and distanced from each other in the lateral direction. According to the above-described configuration, it is possible to provide a ventilation apparatus that can change a flow direction of air in the lateral direction of the vehicle while suppressing a pressure loss of air and a damage of the ventilation apparatus.

7 Claims, 10 Drawing Sheets

(51) Int. Cl.
  *F24F 13/14* (2006.01)
  *F24F 13/06* (2006.01)
  *B60H 1/00* (2006.01)

(52) U.S. Cl.
  CPC ........ *B60H 1/345* (2013.01); *B60H 2001/006* (2013.01); *B60H 2001/3471* (2013.01); *F24F 2221/28* (2013.01)

(58) Field of Classification Search
  USPC ........ 454/140, 141, 143, 152, 137, 155, 154
  See application file for complete search history.

(56) References Cited

U.S. PATENT DOCUMENTS

| | | | | |
|---|---|---|---|---|
| 5,238,448 A * | 8/1993 | Komori | ................ | B60H 1/3421 454/155 |
| 5,256,104 A * | 10/1993 | Arold | ................ | B60H 3/0608 454/158 |
| 5,312,133 A * | 5/1994 | Pietila | ................ | B60H 1/0055 180/90 |
| 6,494,780 B1 * | 12/2002 | Norbury, Jr. | ............ | F24F 13/06 454/155 |
| 6,739,968 B1 * | 5/2004 | Gehring | ............. | B60H 1/00542 454/143 |
| 2007/0295706 A1 * | 12/2007 | Brun | ................... | B60H 1/2225 219/202 |
| 2010/0099347 A1 * | 4/2010 | Raible | ................... | B64D 13/00 454/152 |
| 2010/0226769 A1 | 9/2010 | Helps | | |
| 2011/0045758 A1 * | 2/2011 | Bastian | ................ | B60H 1/3428 454/152 |
| 2014/0113536 A1 * | 4/2014 | Goenka | ............. | B60H 1/00028 454/152 |
| 2014/0256244 A1 * | 9/2014 | Sakurai | ................. | B60H 1/245 454/140 |
| 2014/0302769 A1 | 10/2014 | Sawada | | |
| 2015/0017902 A1 * | 1/2015 | Sakurai | ................. | B60H 1/247 454/143 |
| 2016/0039389 A1 * | 2/2016 | Kato | ................... | B60H 1/3414 454/127 |
| 2016/0121695 A1 * | 5/2016 | Sakurai | ............. | B60H 1/00564 454/152 |

FOREIGN PATENT DOCUMENTS

| | | |
|---|---|---|
| JP | 2011168140 A | 9/2011 |
| JP | 5068839 B2 | 11/2012 |
| JP | 2013006587 A | 1/2013 |
| JP | 2014004974 A | 1/2014 |
| JP | 2014083919 A | 5/2014 |
| JP | 2014139066 A | 7/2014 |
| JP | 2014210564 A | 11/2014 |
| JP | 2015016843 A | 1/2015 |
| WO | WO-2013145172 A1 | 10/2013 |
| WO | WO-2014097605 A1 | 6/2014 |

* cited by examiner

FIG. 10

VENTILATION APPARATUS

CROSS REFERENCE TO RELATED APPLICATIONS

This application is a U.S. National Phase Application under 35 U.S.C. 371 of International Application No. PCT/JP2015/003174 filed on Jun. 24, 2015 and published in Japanese as WO 2016/006187 A1 on Jan. 14, 2016. This application is based on and claims the benefit of priority from Japanese Patent Application No. 2014-141884 filed on Jul. 10, 2014. The entire disclosures of all of the above applications are incorporated herein by reference.

TECHNICAL FIELD

The present disclosure relates to a ventilation apparatus that blows air into a vehicle compartment of a vehicle.

BACKGROUND ART

A ventilation apparatus that blows air into a vehicle compartment of a vehicle using Coanda effect is known.

For example, Patent Literature 1 discloses a ventilation apparatus disposed on a ceiling of a vehicle. In the ventilation apparatus, air blowing from a first blowing outlet flows along an outer surface of a duct by Coanda effect and flows toward a rear side of the vehicle while drawing air flowing around the air. As a result, the air is supplied to the vehicle compartment in a state that a volume of the air supplied to the vehicle compartment is larger than a volume of the air at a time of being blown from the first blowing outlet.

The ventilation apparatus of Patent Literature 1 further has a second blowing outlet other than the first blowing outlet, and the second blowing outlet blows air downward. The second blowing outlet blows the air such that the air joins, from an upper side, air blown from the first blowing outlet. The ventilation apparatus can change a flow direction of air in a longitudinal direction of the vehicle by changing a balance between flow rates of air blowing from the first blowing outlet and the second blowing outlet respectively. The ventilation apparatus of Patent Literature 1 thus does not need to have a member such as a resister that is provided on a ceiling of the vehicle to change a flow direction of air in the longitudinal direction.

PRIOR ART LITERATURES

Patent Literature

Patent Literature 1: WO 2013/145172 A1

SUMMARY OF INVENTION

According to studies conducted by the inventor of the present disclosure, a ventilation apparatus disposed in a vehicle compartment is required to be capable of changing a flow direction of air in a lateral direction of a vehicle to guide the air toward a specified passenger or toward a windshield of the vehicle for defrosting. However, the ventilation apparatus disclosed in Patent Literature 1 is limited to change the flow direction of air in the longitudinal direction, and Patent Literature 1 suggests no specific manner to change the flow direction in the lateral direction.

Then, it is considered that a guide vane is disposed on a downstream side of the first blowing outlet to guide air from the first blowing outlet to flow along the guide vane in order to change a flow velocity component of the air in the lateral direction. However, the guide vane becomes a drag for air blown from the first blowing outlet at high speed, and thereby a pressure loss may be caused in the air, or Coanda effect may be disturbed. In addition, the guide vane may be damaged by an inadvertent contact since the guide vane is arranged at a location where a passenger easily touches the guide vane.

The present disclosure addresses the above issues, and thus it is an objective of the present disclosure to provide a ventilation apparatus that can change a flow direction of air in a lateral direction of a vehicle while suppressing a pressure loss of air and a damage of the ventilation apparatus.

A ventilation apparatus blows air into a vehicle compartment of a vehicle. The ventilation apparatus has a blower, a duct, a blowing outlet, guide vanes, and a turning mechanism. The blower blows air. The air blowing from the blower is introduced into the duct. The blowing outlet is provided with the duct. The blowing outlet guides the air to flow along a lower surface of the duct and blows the air into the vehicle compartment. The guide vanes change a flow velocity component of the air in a lateral direction of the vehicle by guiding the air to flow along the guide vanes. The turning mechanism turns the guide vanes. The duct extends in the lateral direction. The guide vanes are arranged in the duct on an upstream side of the blowing outlet and distanced from each other in the lateral direction.

The ventilation apparatus has the guide vane that is disposed in the duct and changes the flow velocity component of the air in the lateral direction. As a result, a configuration in which a passenger in the vehicle does not touch the guide vane easily can be provided, and a damage of the guide vane can be suppressed. The guide vane is arranged on the upstream side of the blowing outlet and changes the flow velocity component of air in the lateral direction before the air is blown from the blowing outlet at high speed. As a result, a pressure loss caused in the air blown from the blowing outlet at high speed and a noise caused by the air can be suppressed.

Inside the duct, the flow velocity component of air in the lateral direction is changed while the air is flowing along the guide vane. Subsequently, the air from the blowing outlet flows along the lower surface of the duct by Coanda effect while the flow velocity component is retained by inertia. A change rate of the flow velocity component of air in the lateral direction can be changed by turning the guide vane, such that a flow direction of the air blowing from the blowing outlet can be changed in the lateral direction.

The present disclosure thus can provide a ventilation apparatus that can change a flow direction of air in a lateral direction of a vehicle while suppressing a pressure loss of air and a damage of the ventilation apparatus.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

First Embodiment

A general description regarding a ventilation apparatus according to a first embodiment will be described hereinafter.

Figure 1:
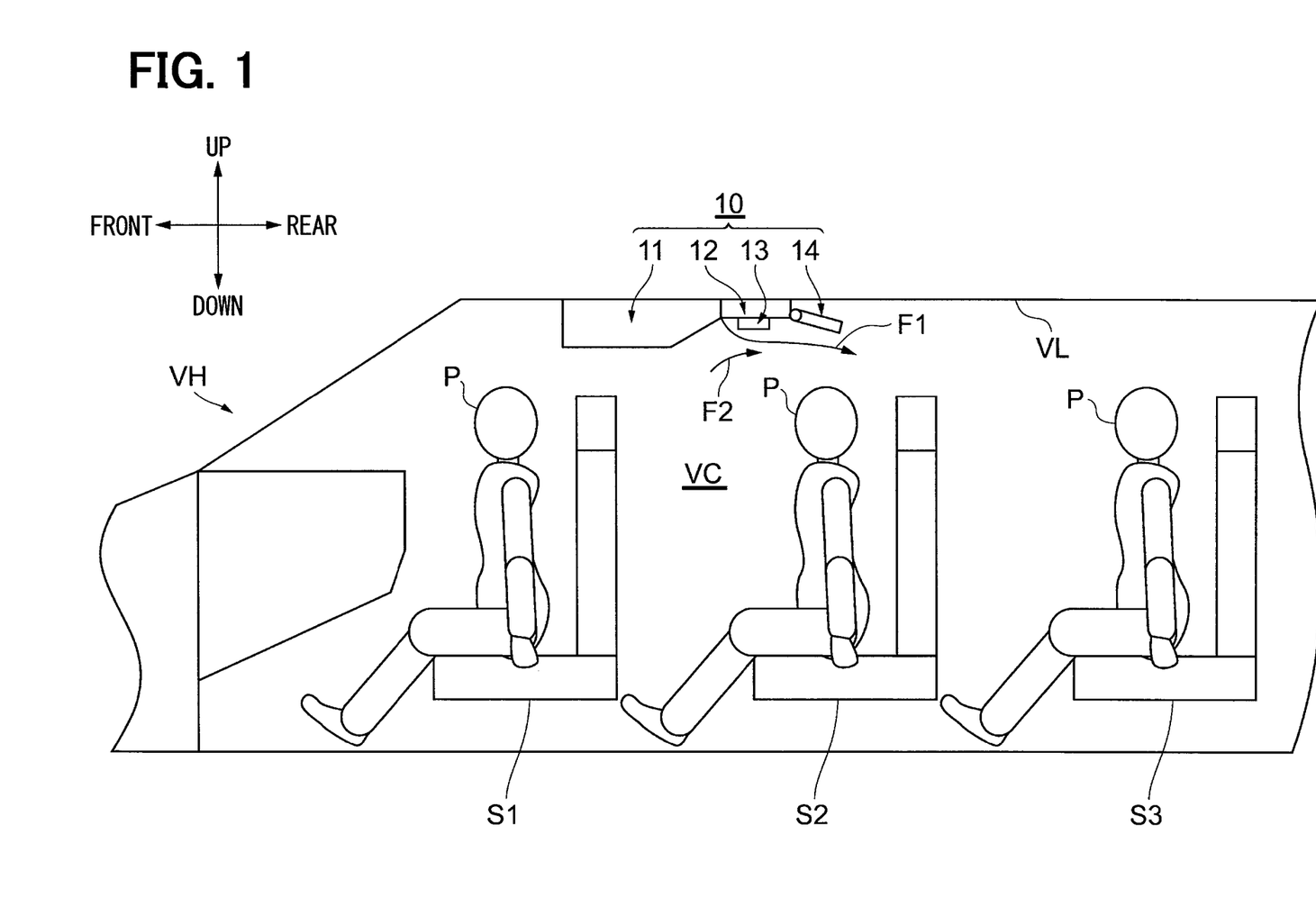
FIG. 1 is a schematic diagram illustrating a vehicle having a ventilation apparatus according to a first embodiment when viewed from a left side.
Figure 2:
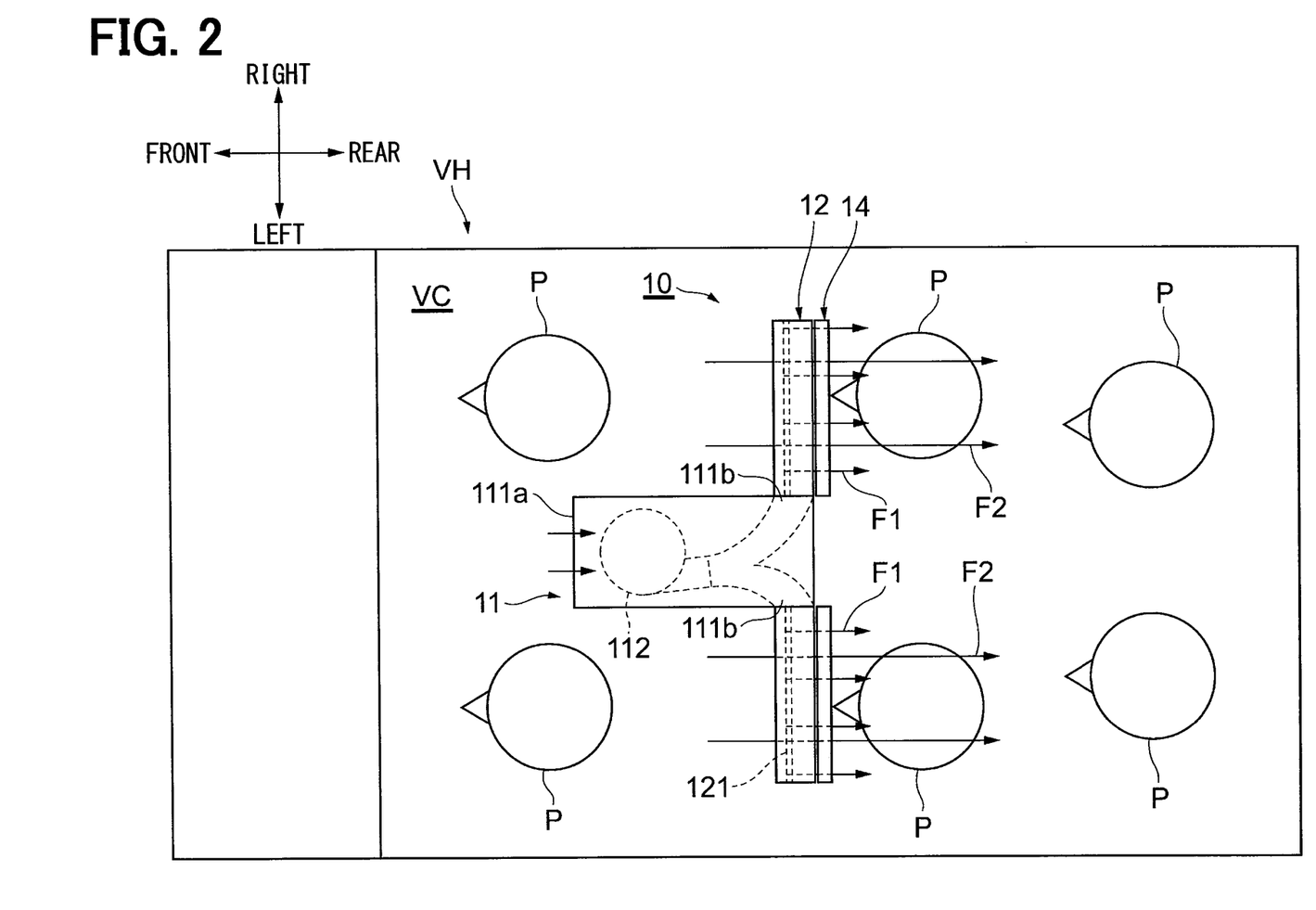
FIG. 2 is a schematic diagram illustrating the vehicle having the ventilation apparatus according to the first embodiment when viewed from an upper side.
Figure 3:
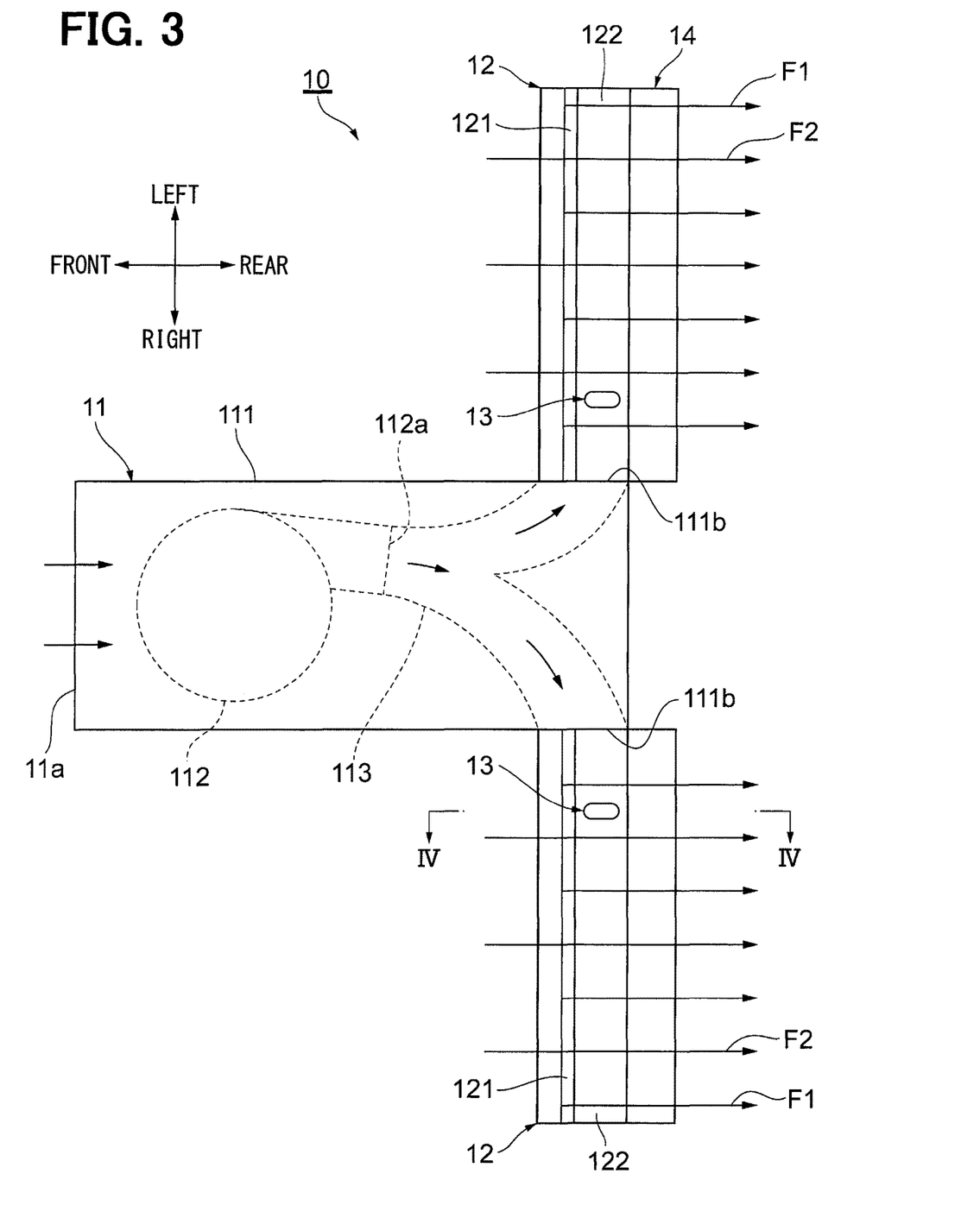
FIG. 3 is a schematic diagram illustrating the ventilation apparatus when viewed from a lower side.

As shown in FIG. 1 through FIG. 3, a ventilation apparatus 10 of the first embodiment has a blower unit 11, two ducts 12, a turning mechanism 13 and two flaps 14, 14. The ventilation apparatus 10 is attached to a ceiling VL in a vehicle compartment VC of a vehicle VH. Seats S1, S2, S3 are arranged in a first line through a third line respectively in the vehicle compartment VC, and the ventilation apparatus 10 is located above a head of a passenger P seating the seat S1, S2, S3.

In the following description, a longitudinal direction, a lateral direction and an up-down direction respectively mean a front-rear direction, a left-right direction and an up-down direction when the passenger P faces a travel direction of the vehicle VH.

The blower unit 11 is a device that blows air to be supplied to the vehicle compartment VC and has a case 111, a blower 112, and a branch portion 113.

The case 111 has a flat shape of which dimension in the up-down direction is smaller than a dimension in other directions. The case 111 is arranged in a center area in the vehicle compartment VC in the lateral direction. The case 111 has a front end portion provided with a suction port 111a through which an inside and an outside of the case 111 communicate with each other. The case 111 has a left side surface and a right side surface in a rear portion of the case 111, and the left side surface and the right side surface are provided with a pair of blowing outlets 111b respectively. The inside and the outside of the case 111 communicate with each other through the pair of blowing outlets 111b.

The blower 112 is an electric blower blowing air and housed in the case 111. The blower 112 therein has a centrifugal multi-blades fan (not shown). Air in the vehicle compartment VC is drawn through the suction port 111a of the case 111 and blown from the blowing outlet 112a of the blower 1112 toward a rear side when the centrifugal multi-blades fan rotates.

The branch portion 113 extends rearward from the front end portion to a rear end portion and is branched in the lateral direction between the front end portion and the rear end portion, the branch portion 113 thereby has a T-shape. The branch portion 113 is housed in the case 111 and defines a branch passage 113a in the case 111. The branch portion 113 has a front end connected to the blowing outlet 112a of the blower 112 and a rear end connected to the pair of blowing outlets 111b. Air blowing from the blowing outlet 112a of the blower 112 is thereby introduced to the branch passage 113a and separated into two flows and supplied to the pair of blowing outlets 111b of the case 111.

The two ducts 12 are arranged on both of a left side and a right side of the blower unit 11 respectively. The two ducts 12 are a hollow member formed to extend straight in the lateral direction, and ends of the ducts 12 adjacent to the case 111 are connected to the pair of blowing outlets 111b of the case 111 respectively. Each of the ducts 12 has a lower surface 122, and a front portion of the lower surface 122 has a blowing outlet 121 having a slit shape. Air from the blower 112 is introduced into the ducts 12 through the blowing outlets 111b of the case 111 and blown from the blowing outlets 121 of the ducts 12. The two ducts 12 are formed to be generally symmetric in the lateral direction, and thereby the duct 12 on a right side will be taken and described as an example hereinafter.

The flap 14 is a member having a flat shape and arranged on a rear side of the duct 12. The flap 14 has an end portion on a side adjacent to the duct 12, and the end portion is supported by a rotary shaft 141 (refer to FIG. 4) extending generally parallel to the lateral direction. The flap 14 is thereby rotatable around the rotary shaft 141.

A detail configuration of the duct 12 for the ventilation apparatus 10 according to the first embodiment and effects provided by the configuration will be described hereafter.

Figure 4:
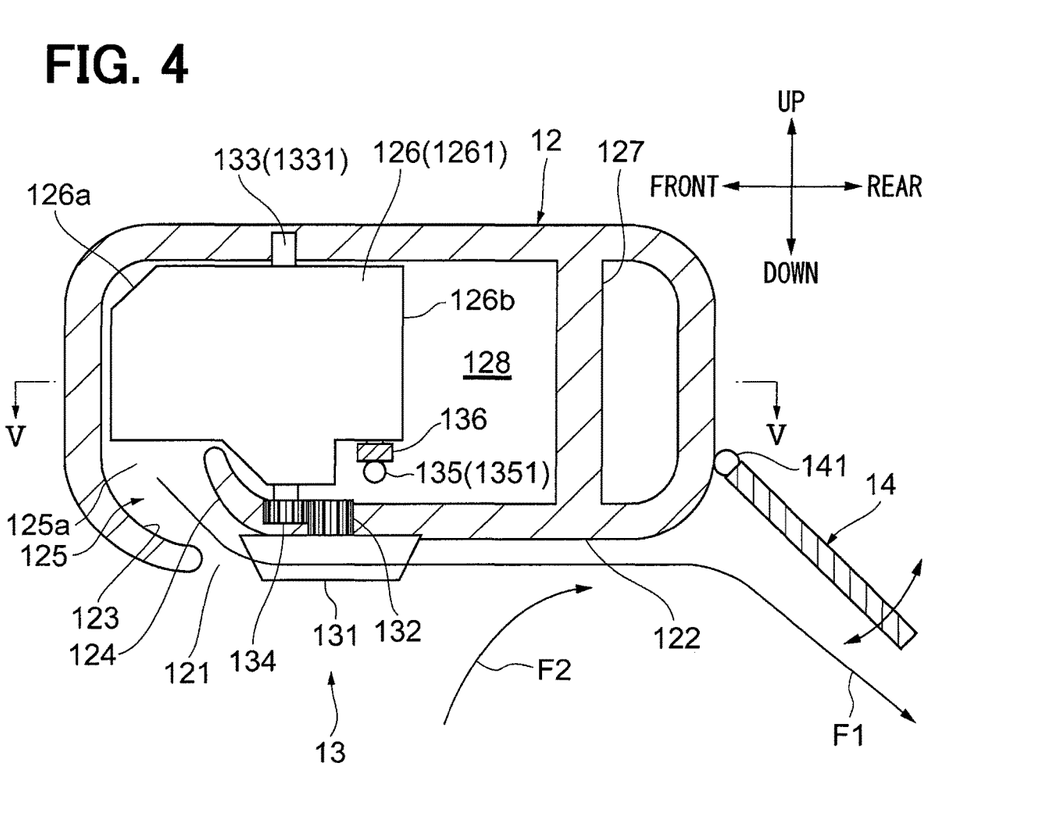
FIG. 4 is a cross-sectional view taken along a line IV-IV shown in FIG. 3.
Figure 5:
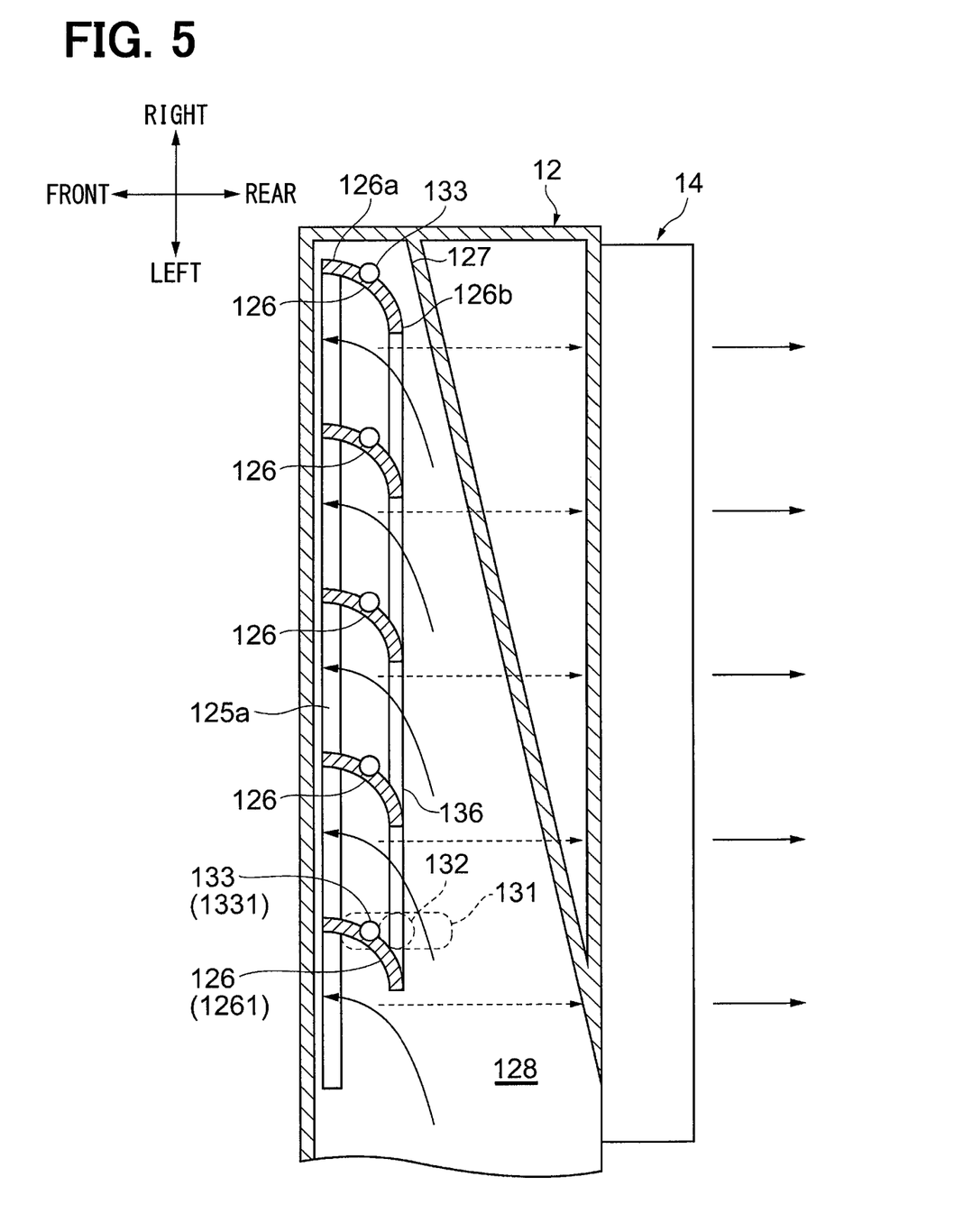
FIG. 5 is a cross-sectional view taken along a line V-V shown in FIG. 4.

As shown in FIG. 4, the duct 12 has a guide wall 127 that partitions an inside of the duct 12 in the longitudinal direction. The guide wall 127 inclines with respect to the longitudinal direction and extends straight in the lateral direction as shown in FIG. 5. A duct inside passage 128 defined in a front area of the inside of the duct 12 has a sectional area gradually decreasing from a side adjacent to the case 111 toward both ends in the lateral direction.

As shown in FIG. 4, the blowing outlet 121 is provided in a lower portion of the lower surface 122 of the duct 12 on a lower side of the duct inside passage 128. An inside and an outside of the duct inside passage 128 communicate with each other through the blowing outlet 121. A wall surface of the duct 12 has an end portion located on a rear side of the blowing outlet 121 and is curved such that the end portion is located inside of the duct inside passage 128. The duct 12 thereby has a wall surface 123 and a wall surface 124 distanced from each other, and a throttle path 125 extending from an inlet 125a to the blowing outlet 121 is formed between the wall surface 123 and the wall surface 124. The throttle path 125 has a sectional area gradually decreasing from the inlet 125a toward the blowing outlet 121.

As shown in FIG. 5, more than one of a guide vane 126 are arranged in the duct inside passage 128 to be arranged in line and distanced from each other in the lateral direction. According to the present embodiment, a quantity of the guide vanes 126 is five. The guide vane 126 is a plate member that is curved and has a rear end 126b facing a side adjacent to the blower unit 11 and a front end 126a facing a side adjacent to the inlet 125a of the throttle path 125. An outer surface of the guide vane 126 thereby has an arc shape in a planar view. Each guide vane 126 is provided such that the front end 126a overlaps with the inlet 125a of the throttle path 125 on an upstream side of the blowing outlet 121 of the duct 12 in the planar view.

The five of the guide vanes 126 change a flow velocity component of the air in the lateral direction by guiding the air to flow along the outer surface having the arc shape. According to an example shown in FIG. 5, air flowing in the duct inside passage 128 has a frontward flow velocity component and a rightward flow velocity component. However, the rightward flow velocity component disappears since the air flows along the outer surface of the guide vane 126. A flow direction of the air is therefore changed to a direction generally parallel to the longitudinal direction, and the air flows into the inlet 125a of the throttle path 125.

The air flowing into the inlet 125a flows in the throttle path 125 toward the blowing outlet 121, and thereby a flow speed of the air is increased. The air in the duct inside passage 128 flows into the inlet 125a in the direction generally parallel to the longitudinal direction. As a result, the air flows through the throttle path 125 in the direction generally parallel to the longitudinal direction and is blown rearward from the blowing outlet 121 of the duct 12. A flow direction of air blown rearward from the blowing outlet 121 of the duct 12 thereby becomes generally parallel to the longitudinal direction. The air from the blowing outlet 121 of the duct 12 flows along the lower surface 122 of the duct 12 by Coanda effect and provides a primary airflow F1 of which flow speed is higher than that of the air inside the duct 12.

When the primary airflow F1 is provided by air blown from the blowing outlet 121, a secondary airflow F2 is provided by drawing the primary airflow F1 due to an ejector effect of the primary airflow F1. As a result, the air from the blowing outlet 121 of the duct 12 is supplied to a rear side while a volume of air is increasing. A flow direction of the primary airflow F1 and a flow direction of the secondary airflow F2 are changed in the longitudinal direction by flowing along a lower surface of the flap 14.

The turning mechanism 13 that turns the five of the guide vane 126 is attached to the duct 12. The turning mechanism 13 will be described hereafter. The turning mechanism 13 has a lever 131, five of a rotary shaft 133, five of a pin 135, and a rod 136.

The lever 131 is a member that is operated by the passenger P to operate the turning mechanism 13. The lever 131 is provided in a portion of the lower surface 122 of the duct 12 around a center of the vehicle VH in the lateral direction. As shown in FIG. 5, the lever 131 is formed to have a flat shape in a planar view, and a longitudinal direction of the lever 131 is the front-rear direction. A gear 132 is formed in a center portion of an upper surface of the lever 131 to protrude upward. The gear 132 is arranged inside the duct 12.

The rotary shaft 133 is a member having a columnar shape that extends from an upper end to a lower end of the guide vane 126 in the up-down direction. The rotary shaft 133 is formed integrally with the guide vane 126. Both ends of each rotary shaft 133 in the up-down direction are supported by wall surfaces of the duct inside passage 128, and the guide vane 126 is rotatable around the rotary shaft 133. The rotary shafts 133 include a rotary shaft 1331 that is arranged to be closest to the blower unit 11, and a gear 134 is fixed to an end portion of the rotary shaft 1331. The gear 134 of the rotary shaft 1331 is arranged to engage with the gear 132 of the lever 131.

As shown in FIG. 4, the pin 135 is formed to protrude downward from a lower surface of a rear end 126b of the guide vane 126. Each pin 135 is formed integrally with each guide vane 126.

As shown in FIG. 5, the rod 136 is an elongate member extending straight in the lateral direction. The rod 136 connects five of the guide vanes 126 with each other by being locked with respect to the pin 135 of each of the guide vanes 126.

In the turning mechanism 13 configured as described above, a torque is generated when the passenger P in the vehicle VH turns the lever 131, and the torque is transmitted to the rotary shaft 1331 through the gear 132 and the gear 134. The rotary shaft 1331 and a guide vane 1261 that are arranged to be closest to the blower unit 11 rotate around the rotary shaft 1331.

The rod 136 receives force in the lateral direction from a pin 1351 provided with the guide vane 1261 when the guide vane 1261 turns, and the force is transmitted from the rod 136 to the pins 135 provided with other guide vanes 126. The force that the other guide vanes 126 other than the guide vane 1261 receive in the lateral direction from the rod 136 at the pins 135 becomes a rotational moment around the rotary shaft 133 of each guide vane 126. The five of the guide vane 126 turn all together in one direction when the passenger P turns the lever 131.

Figure 6:
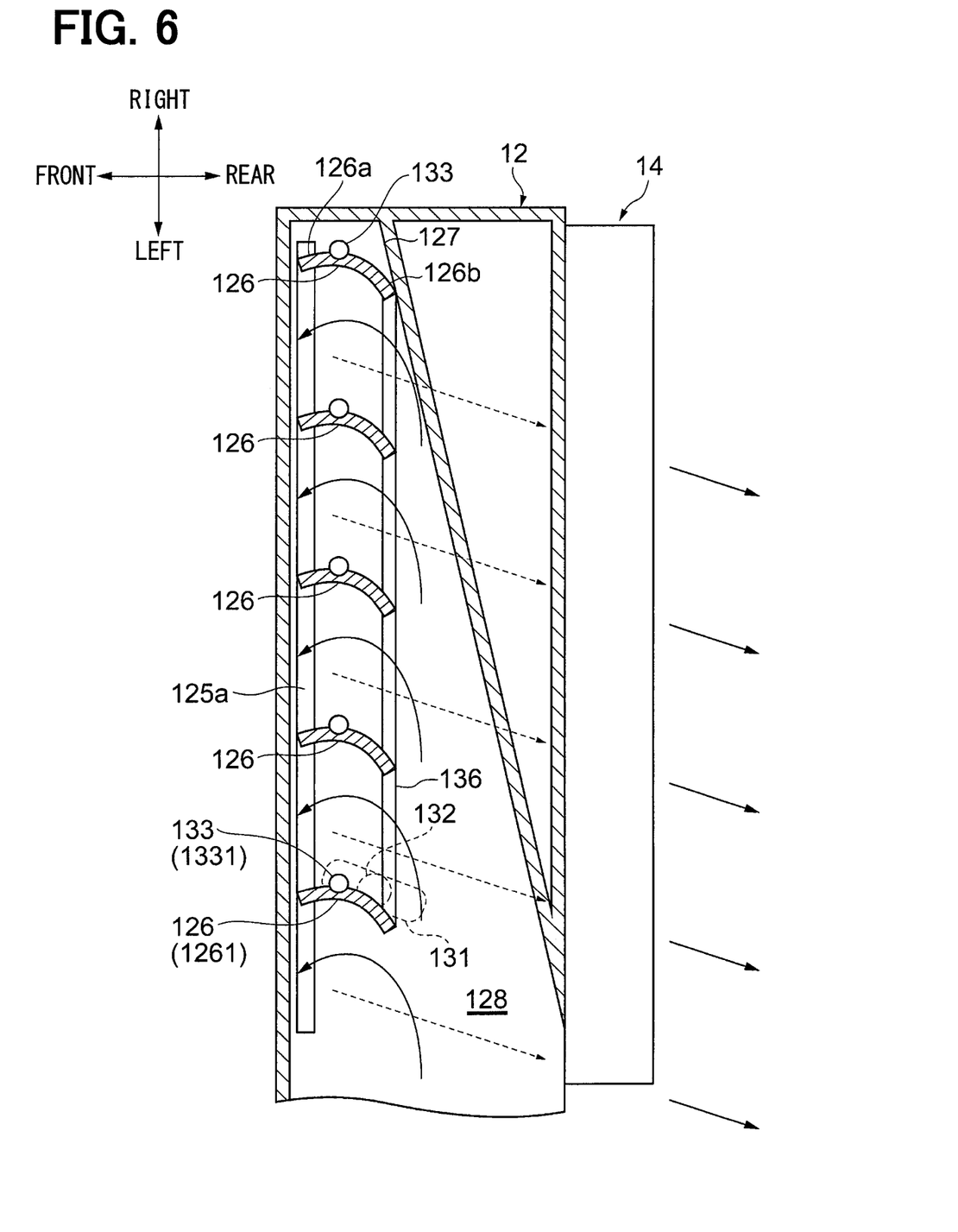
FIG. 6 is a diagram illustrating the guide vane moved from a position shown in FIG. 5.

A case where the front end of the lever 131 is turned to face rightward as shown in FIG. 6 will be described hereafter. The five of the guide vane 126 is turned in response to the turn of the lever 131 such that the front end 126a faces leftward. Air in the duct inside passage 128 flows along the outer surface of the guide vane 126 and takes a leftward flow velocity component. The air in the duct inside passage 128 thereby changes a flow direction to a front-left direction and flows into the inlet 125a of the throttle path 125.

Air flowing into the inlet 125a flows in the throttle path 125 toward the blowing outlet 121. A flow direction of the air is changed by 180 degree, and thereby the air is blown from the blowing outlet 121 while the leftward flow velocity component is being retained by inertia throughout a whole throttle path 125. A direction in which the air flows out of the duct 12 through the blowing outlet 121 becomes rear-left direction. The air becomes a primary airflow that flows along the lower surface 122 of the duct 12 by Coanda effect, and is supplied toward a rear left side after a flow direction of which is changed in the longitudinal direction by the flap 14.

Figure 7:
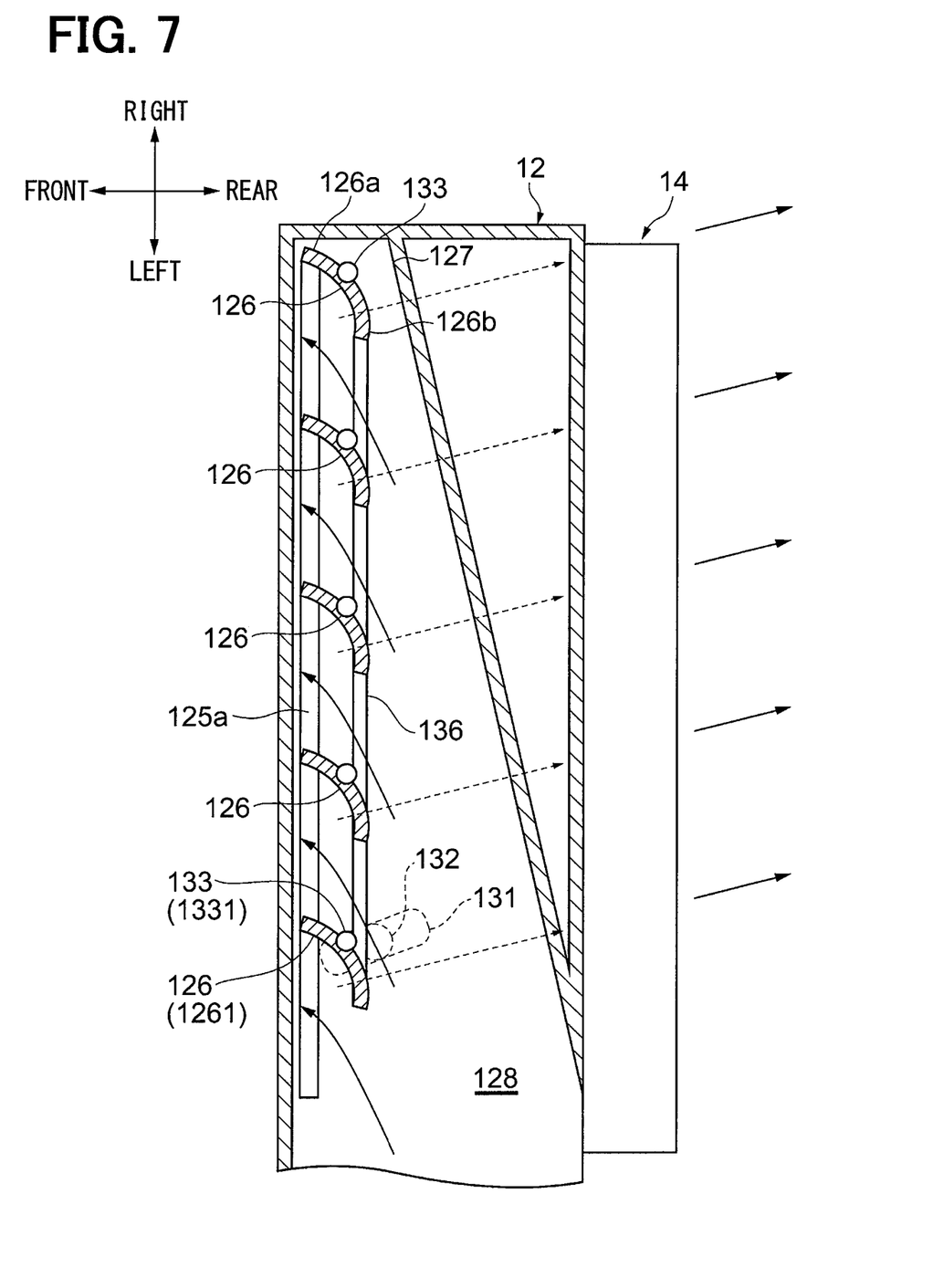
FIG. 7 is a diagram illustrating the guide vane moved from a position shown in FIG. 5.

A case where the front end of the lever is turned to face leftward as shown in FIG. 7 will be described hereafter. The five of the guide vane 126 is turned in response to the turn of the lever 131 such that the front end 126a faces rightward. Air in the duct inside passage 128 flows along the outer surface of the guide vane 126 and takes a rightward flow velocity component. The air in the duct inside passage 128 thereby changes a flow direction to a front-right direction and flows into the inlet 125a of the throttle path 125.

Air flowing into the inlet 125a flows in the throttle path 125 toward the blowing outlet 121. A flow direction of the air is changed by 180 degree, and thereby the air is blown from the blowing outlet 121 while the rightward flow velocity component is being retained by inertia throughout a whole throttle path 125. A direction in which the air flows out of the duct 12 through the blowing outlet 121 becomes rear-right direction. The air becomes a primary airflow that flows along the lower surface 122 of the duct 12 by Coanda effect, and is supplied toward a rear right side after a flow direction of which is changed in the longitudinal direction by the flap 14.

As described above, the guide vane 126 that changes the flow velocity component of air in the lateral direction is disposed in the duct 12 according to the ventilation apparatus 10 of the first embodiment. As a result, a configuration in which the passenger P in the vehicle VH does not touch the guide vane 126 easily can be provided, and a damage of the guide vane 126 can be suppressed.

The guide vane 126 is arranged on the upstream side of the blowing outlet 121 of the duct 12. The guide vane 126 is arranged on the upstream side of the throttle path 125 of which sectional area is decreased gradually toward the blowing outlet 121. The flow velocity component of the air is thereby changed in the lateral direction before a flow speed of the air is increased by flowing from the inlet 125a of the throttle path 125 to the blowing outlet 121. As a result, a pressure loss caused in air blowing from the blowing outlet 121 at high speed and a blast noise caused by blowing the air can be suppressed.

The flow velocity component of air in the lateral direction is changed by the guide vane 126 in the duct 12. Subsequently, the air from the blowing outlet 121 flows along the lower surface 122 of the duct 12 by Coanda effect while retaining the flow velocity component by inertia. A change rate of the flow velocity component of air in the lateral direction can be changed by turning the guide vane 126, such that a flow direction of the air blowing from the blowing outlet 121 can be changed in the lateral direction.

Furthermore, the ventilation apparatus 10 changes the flow velocity component, in the longitudinal direction, of the air blowing from the blowing outlet 121 of the duct 12 by the flap 14 provided outside the duct 12. The noise caused by the air thereby can be suppressed more certainly as compared to a case of changing a flow direction of air in the longitudinal direction by mixing air flows.

The lever 131 is formed such that the longitudinal direction of which is parallel to a direction in which the blowing outlet 121 of the duct 12 blows air. Accordingly, the passenger P can sensuously figure out the direction in which the blowing outlet 121 of the duct 12 blows air when operating the lever 131.

The lever 131 is disposed in an area adjacent to a center of the vehicle VH in the lateral direction. More than one of the passenger P in the vehicle compartment VC can therefore operate the lever 131 easily.

Second Embodiment

A ventilation apparatus according to a second embodiment will be described referring to FIG. 8 and FIG. 9. The ventilation apparatus according to the second embodiment has turning mechanisms 13a, 13b of which configuration is different from that of the turning mechanism 13 of the ventilation apparatus 10 according to the first embodiment. Other configuration of the ventilation apparatus according to the second embodiment is substantially the same as that of the ventilation apparatus 10. The same component is thereby assigned with the same reference number, and an explanation is omitted.

Figure 8:
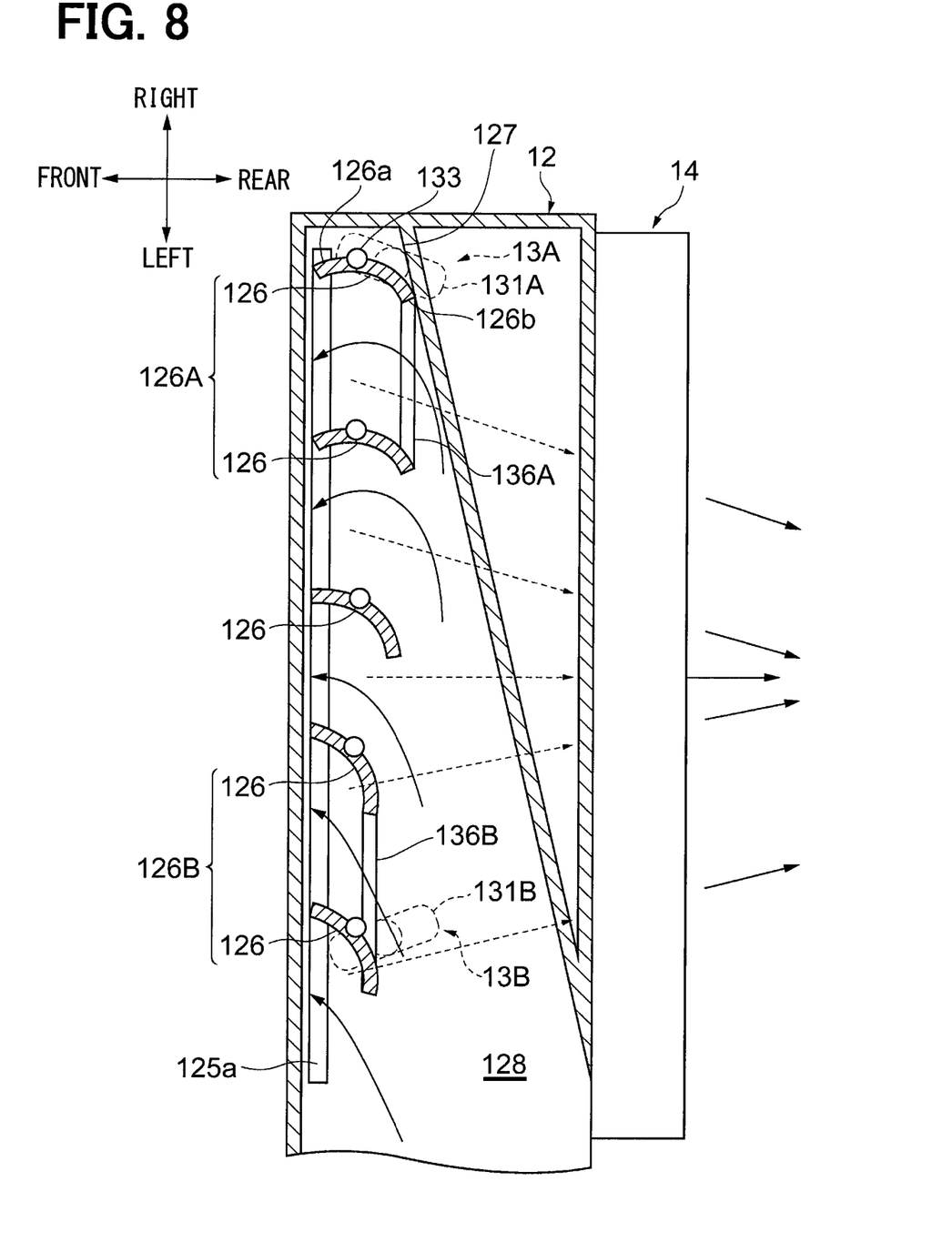
FIG. 8 is a cross-sectional diagram illustrating a ventilation apparatus according to a second embodiment.
Figure 9:
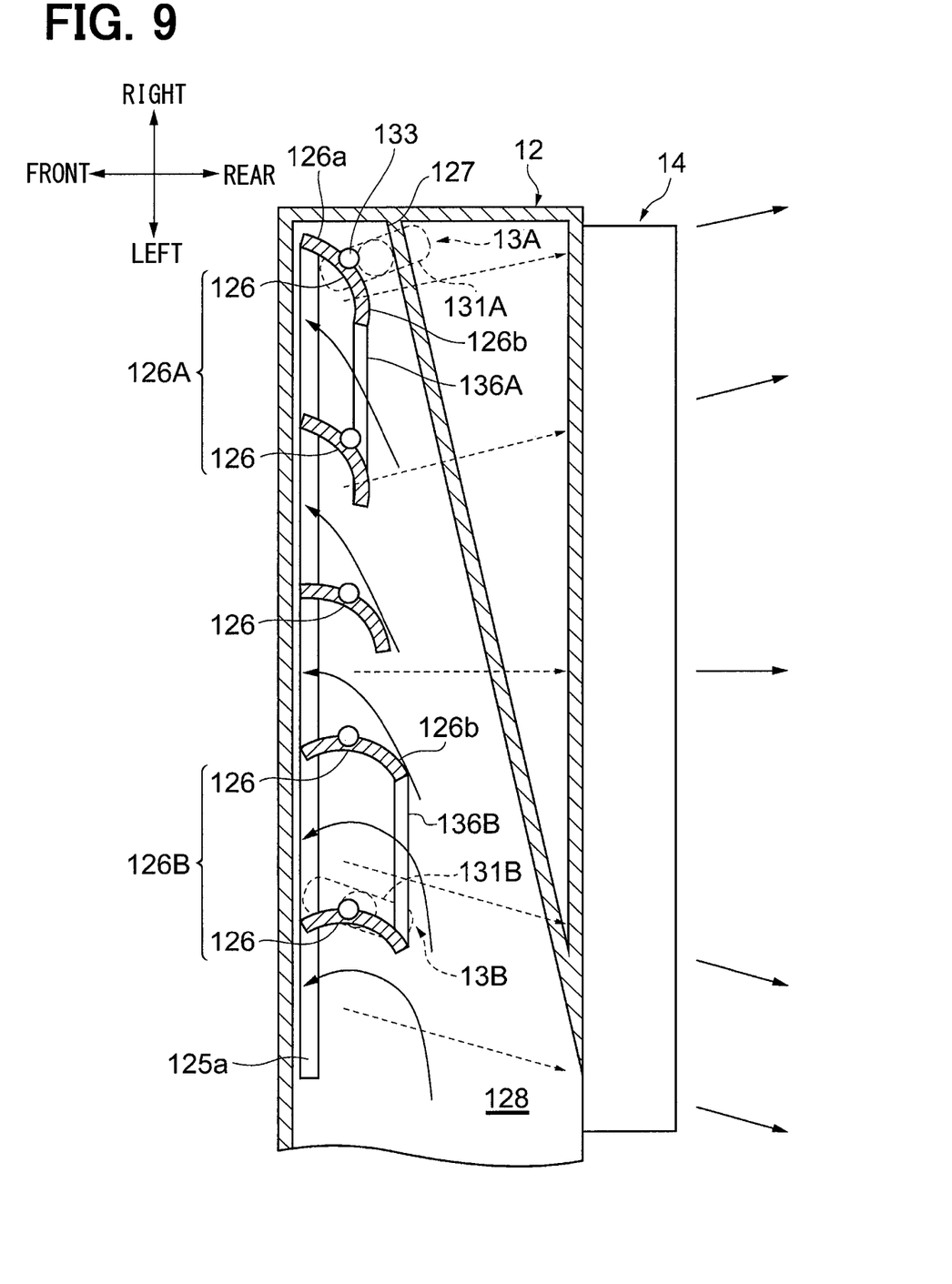
FIG. 9 is a diagram illustrating a guide vane moved from a position shown in FIG. 8.

As shown in FIG. 8 and FIG. 9, five of the guide vane 126 are disposed in the duct inside passage 128 to be arranged in line in the lateral direction to be distanced from each other. Two guide vanes 126 of the five of guide vane 126 arranged on a side adjacent to a right end of the duct inside passage 128 configure a first guide vane group 126A. Two guide vanes 126 of the five of guide vane 126 arranged on a side adjacent to a left end of the duct inside passage 128 configure a second guide vane group 126B. The rest of the five of guide vane 126 is located between the first guide vane group 126A and the second guide vane group 126B.

The turning mechanism 13A that turns the first guide vane group 126A and the turning mechanism 13B that turns the second guide vane group 126B are attached to the duct 12 independently from each other. The turning mechanism 13A has a rod 136A and a lever 131A, and the rod 136A connects the two guide vanes 126 configuring the first guide vane group 126A with each other. The turning mechanism 13B has a rod 136B and a lever 131B, and the rod 136B connects the two guide vanes 126 configuring the second guide vane group 126B with each other. The passenger P can turn the first guide vane group 126A and the second guide vane group 126B independently from each other by turning the lever 131A and the lever 131B. A mechanism of turning the first guide vane group 126A and the second guide vane group 126B based on a turn of the lever 131A and the lever 131B respectively is the same as the turning mechanism 13 of the ventilation apparatus 10 according to the first embodiment.

Regarding the turning mechanisms 13A, 13B, a case where a front end of the lever 131A is turned to face rightward, and a front end of the lever 131B is turned to face leftward, as shown in FIG. 8, will be described hereafter. The two guide vanes 126 of the first guide vane group 126A is turned such that the front end 126a faces leftward by a turn of the lever 131A. The two guide vanes 126 of the second guide vane group 126B is turned such that the front end 126a faces rightward by a turn of the lever 131B.

Air in an area adjacent to the right end of the duct inside passage 128 takes a leftward flow velocity component by flowing along the outer surface of the two guide vanes 126 of the first guide vane group 126A. Air in an area adjacent to the left end of the duct inside passage 128 takes a rightward flow velocity component by flowing along the outer surface of the two guide vanes 126 of the second guide vane group 126B. The air in the area adjacent to the right end of the duct inside passage 128 thereby changes a flow direction to the front-left direction and flows into the inlet 125a of the throttle path 125. The air in the area adjacent to the left end of the duct inside passage 128 thereby changes a flow direction to the front-right direction and flows into the inlet 125a of the throttle path 125.

The air flowing into the inlet 125a flows in the throttle path 125 toward the blowing outlet 121. A flow direction of the air is changed by 180 degree, and thereby the air is blown from the blowing outlet 121 while the leftward flow velocity component or the rightward flow velocity component is being retained by inertia throughout a whole throttle path 125. The air is thereby blown from the blowing outlet 121 of the duct 12 in a direction such that the air flows rearward and is collected at a point on a rear side. The air becomes a primary airflow that flows along the lower surface 122 of the duct 12 by Coanda effect, and is supplied toward a rear left side after a flow direction of which is changed in the longitudinal direction by the flap 14.

A case where the lever 131A is turned such that the front end faces leftward, and the lever 131B is turned such that the front end faces rightward, as shown in FIG. 9, will be described hereafter. The two guide vanes 126 of the first guide vane group 126A are turned in response to the turn of the lever 131A, such that the front end 126a faces rightward. The two guide vanes 126 of the second guide vane group 126B are turned in response to the turn of the lever 131B, such that the front end 126a faces leftward.

Air in an area adjacent to the right end of the duct inside passage 128 flows along outer surfaces of the two guide vanes 126 of the first guide vane group 126A and takes a rightward flow velocity component. Air in an area adjacent to the left end of the duct inside passage 128 takes a leftward flow velocity component by flowing along outer surfaces of the two guide vanes 126 of the second guide vane group 126B. The air in the area adjacent to the right end of the duct inside passage 128 thereby changes a flow direction to the front-right direction and flows into the inlet 125*a* of the throttle path 125. The air in the area adjacent to the left end of the duct inside passage 128 thereby changes a flow direction to the front-left direction and flows into the inlet 125*a* of the throttle path 125.

Air flowing into the inlet 125*a* flows in the throttle path 125 toward the blowing outlet 121. A flow direction of the air is changed by 180 degree, and thereby the air is blown from the blowing outlet 121 while the leftward flow velocity component or the rightward flow velocity component is being retained by inertia throughout a whole throttle path 125. The air is blown from the blowing outlet 121 of the duct 12 in a direction such that the air flows widely in the lateral direction. The air becomes a primary airflow that flows along the lower surface 122 of the duct 12 by Coanda effect, and is supplied toward a rear left side after a flow direction of which is changed in the longitudinal direction by the flap 14.

As described above, the ventilation apparatus according to the second embodiment has the first guide vane group 126A and the second guide vane group 126B. The first guide vane group 126A has two of the guide vane 126. The second guide vane group 126B has two of the guide vane 126 and is arranged to be adjacent to the first guide vane group 126A in the lateral direction.

The first guide vane group 126A and the second guide vane group 126B are turnable independently from each other. Air thereby can be supplied in various patterns such as a pattern in which the air concentrates on a specified passenger P in the vehicle compartment VC and a pattern in which the air is delivered to a windshield of the vehicle VH for defrosting while being supplied to the passenger P.

Third Embodiment

A ventilation apparatus according to a third embodiment of the present disclosure will be described referring to FIG. 10. The ventilation apparatus according to the third embodiment has a duct 12A of which configuration is different from that of the ventilation apparatus 10 according to the first embodiment. Other configuration of the ventilation apparatus according to the third embodiment is substantially the same as that of the ventilation apparatus 10. The same component is thereby assigned with the same reference number, and an explanation is omitted.

Figure 10:
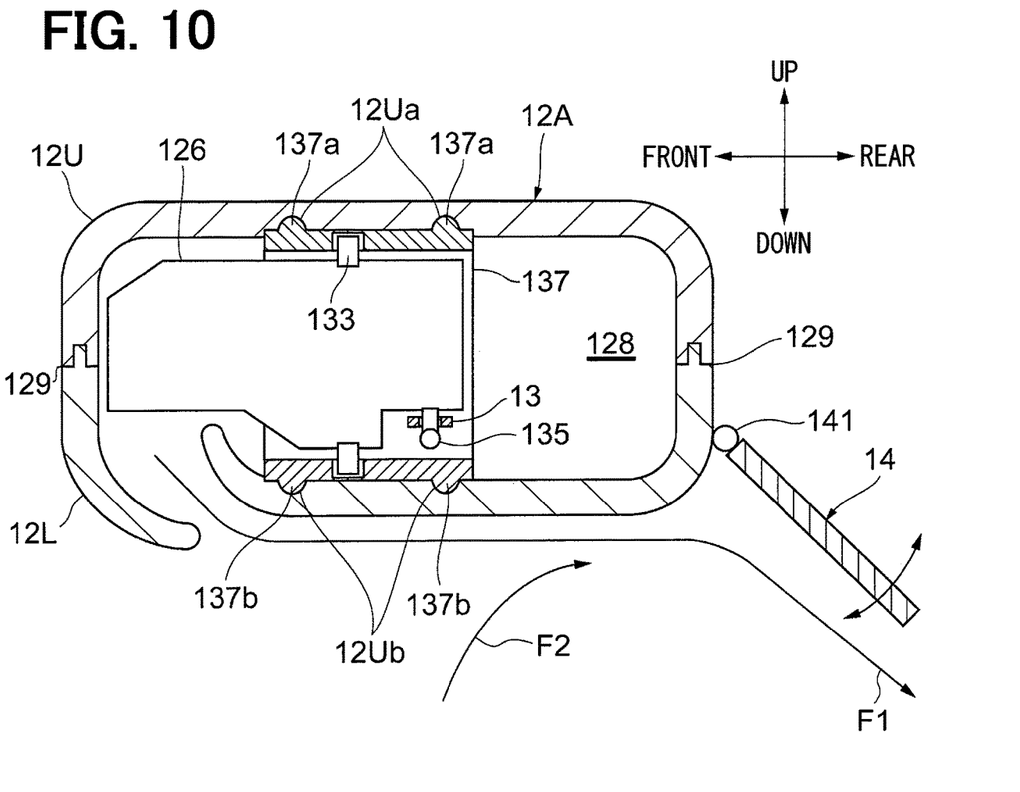
FIG. 10 is a cross-sectional view illustrating a ventilation apparatus according to a third embodiment.

As shown in FIG. 10, the duct 12A has a divided portion 12U and a divided portion 12L. The divided portion 12U and the divided portion 12L fit each other in a fitting portion 129.

A housing 137 having a hole passing through the housing 137 in the longitudinal direction is disposed in the duct 12A. Five of the guide vane 126 are arranged in the hole of the housing 137. The five of the guide vane 126 are arranged in the lateral direction, although single guide vane 126 is shown in FIG. 10 for reasons of expediency. The housing 137 supports the both ends of each rotary shaft 133 in the up-down direction. Each guide vane 126 is turnable around the rotary shaft 133 in the hole of the housing 137. The housing 137 supports the five of the guide vane 126 to be turnable and configure a single unit.

The housing 137 on a condition of being the unit supporting the five of the guide vane 126 is arranged between the divided portion 12U and the divided portion 12L in the up-down direction when the duct 12A is assembled. The housing 137 has an upper surface provided with a protruding portion 137*a* and a lower surface provided with a protruding portion 137*b*. The protruding portion 137*a* engages with a groove 12Ua provided in the divided portion 12U, and the protruding portion 137*b* engages with a groove 12La provided in the divided portion 12L. As a result, a position of the housing 137 in the duct 12A is set. According to the present embodiment, two of the protruding portion 137*a* engage with two of the groove 12Ua respectively, and two of the protruding portion 137*b* engage with two of the groove 12La respectively.

The five of the guide vane 126 are thereby not required to be disposed turnably in the duct 12A when the duct 12A is assembled, and productivity can be improved, by providing the housing 137 as the unit supporting the five of the guide vane 126.

The above-described embodiments of the present disclosure have been described referring to specific examples. However, the present disclosure is not limited to the specific examples. That is, modifications that are made by a person having ordinary skill in the art, as required, based on the specific examples are included in a range of the present disclosure as long as having the features of the present embodiment. For example, elements mentioned in the specific examples, an arrangement, a material, a condition, a shape, a size, etc. of the elements are not limited to above-described examples, and can be changed suitably. Elements mentioned in the specific examples can be combined as long as it is technically possible, and the combination is included in the range of the present disclosure as long as having the features of the present embodiment.

What is claimed is:

1. A ventilation apparatus blowing air into a vehicle compartment of a vehicle, the ventilation apparatus comprising:
   a blower that blows air;
   a duct into which the air blowing from the blower is introduced, the duct extending in a lateral direction of the vehicle;
   a blowing outlet provided with the duct, the blowing outlet guiding the air to flow along a lower surface of the duct and blows the air into the vehicle compartment;
   a plurality of guide vanes that change a flow velocity component of the air in the lateral direction by guiding the air to flow along the plurality of guide vanes;
   a housing formed separately from the duct and disposed in the duct, the housing supporting the plurality of guide vanes therein so as to be turnable; and
   a turning mechanism that turns the plurality of guide vanes, wherein
   the plurality of guide vanes are arranged in the duct on an upstream side of the blowing outlet and distanced from each other in the lateral direction,
   the duct includes a first divided portion and a second divided portion formed separately from each other and coupled to each other with the housing interposed between the first divided portion and the second divided portion, and
   the first divided portion includes a first groove, the second divided portion includes a second groove, the housing includes a first protrusion facing the first groove and a second protrusion facing the second groove, and the first divided portion and the second divided portion are coupled to each other with the first protrusion fitted into the first groove and with the second protrusion fitted into the second groove.

2. The ventilation apparatus according to claim 1, wherein the duct therein has a throttle path that has a sectional area gradually decreasing toward the blowing outlet, and the plurality of guide vanes are arranged on an upstream side of the throttle path.

3. The ventilation apparatus according to claim 1, further comprising a flap that is disposed outside the duct and changes a flow velocity component of the air flowing from the blowing outlet in a longitudinal direction.

4. The ventilation apparatus according to claim 1, wherein the turning mechanism has a lever that is operated to turn the plurality of guide vanes, and the lever is formed such that a longitudinal direction of the lever is parallel to a direction in which the blowing outlet blows the air.

5. The ventilation apparatus according to claim 4, wherein the lever is arranged in an area around a center of the vehicle in the lateral direction.

6. The ventilation apparatus according to claim 1, wherein the plurality of guide vanes are connected to each other by a rod, and the turning mechanism turns the plurality of guide vanes all together.

7. The ventilation apparatus according to claim 1, wherein the plurality of guide vanes include a first guide vane group and a second guide vane group, the second guide vane group is arranged to be adjacent to the first guide vane group in the lateral direction, and the first guide vane group and the second guide vane group are able to turn independently from each other.

* * * * *